UNITED STATES PATENT OFFICE.

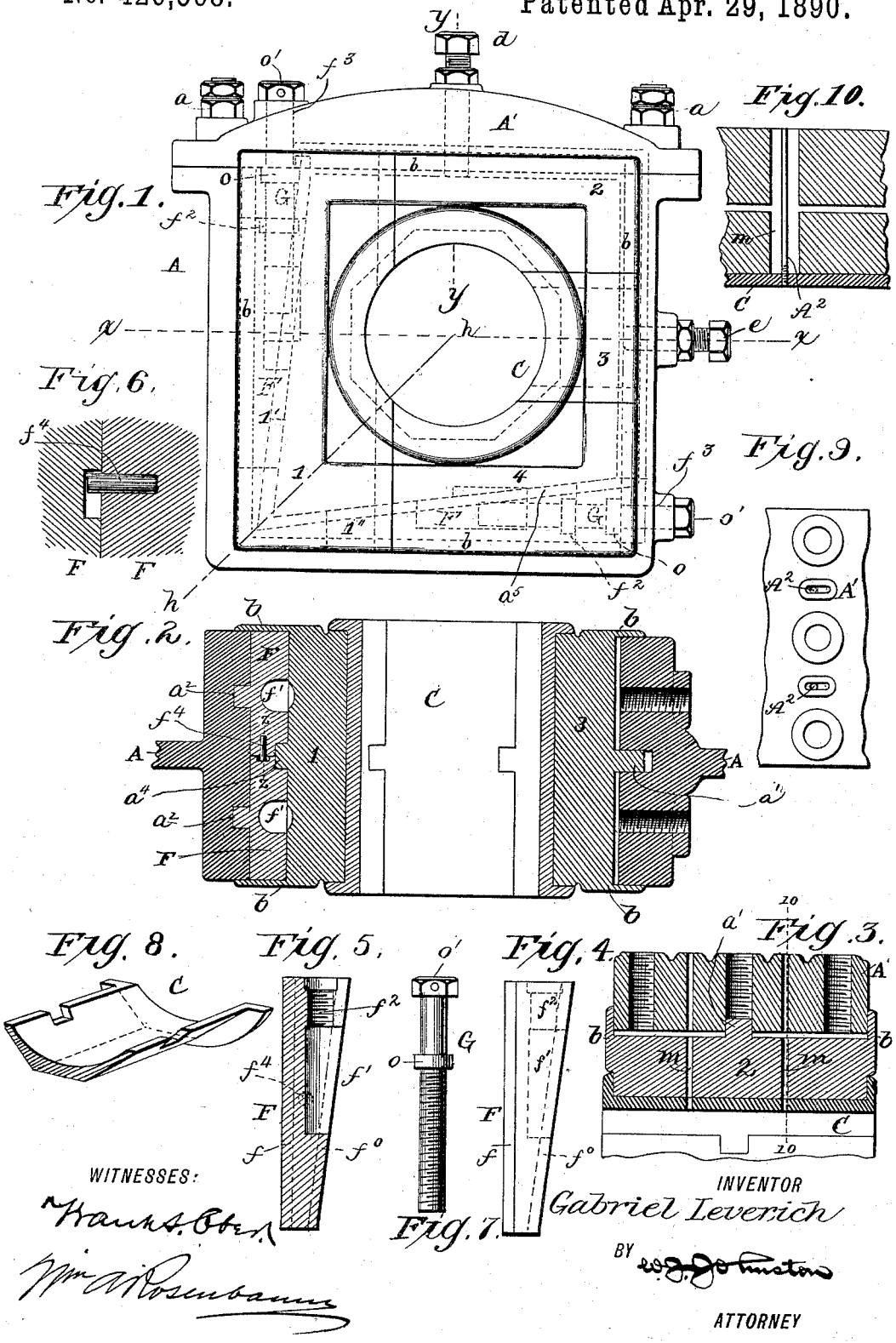

GABRIEL LEVERICH, OF SOUTH ORANGE, NEW JERSEY.

PILLOW-BLOCK.

SPECIFICATION forming part of Letters Patent No. 426,568, dated April 29, 1890.

Application filed January 18, 1890. Serial No. 337,361. (No model.)

*To all whom it may concern:*

Be it known that I, GABRIEL LEVERICH, a citizen of the United States, residing in the township of South Orange, in the county of Essex and State of New Jersey, have invented certain new and useful Improvements in Pillow-Blocks, of which the following is a specification.

This invention relates to pillow-blocks or journal-boxes for rotating shafts, and particularly for the journals of winding-drums of cable-driving plants and similar heavy machinery subject to a large resulting stress acting in a direction inclined to and between the horizontal and vertical planes through the axis of shaft.

As compared to the pillow-blocks heretofore used in heavy machinery, the pillow-block is designed to receive and sustain the load borne by the journal on broad flat surfaces instead of on screws, to permit easy, certain, and precise adjustment in four directions to the journal and underwear, and to allow the substitution of new for worn parts without removing the shaft.

The pillow-block, as arranged to receive the journal of a winding-drum, is shown in the accompanying drawings, Figure 1 being a side elevation, and Fig. 2 a horizontal section through the axis on plane $x\ x$, each including a portion of the drum bed-plate; Fig. 3, a partial vertical section on plane $y\ y$; Fig. 4, a side elevation; Fig. 5, a central transverse section; Fig. 6, a partial view on plane $z\ z$, Fig. 2, of one of the wedges, to be described; Fig. 7, an elevation of a screw for moving a wedge; Fig. 8, a sectional perspective of one-half of a segment of the inner box or bushing; Fig. 9, a partial plan of the pillow-block cap, and Fig. 10 is a detail section on line 10 10 of Fig. 3.

The pillow-block proper rests in a rectangular opening of the bed plate or frame A, and is kept in place by the cap A' and the stud-bolts $a\ a$. Within this opening is the bushing C, which in four segments incloses the journal, the blocks 1 2 3 4 surrounding the bushing, and the wedges F F, between blocks 1 and 4 and the frame. These wedges are alike and in pairs. The inner side of each pair is inclined and fits closely against the similar inclined side of the adjacent block except along the opening $f'$ made in each wedge to receive the projecting threaded end of screw G. This screw passes through a nut $f^2$, formed at the larger end of the wedge, and a hole $f^3$ in the side of the frame or cap, as shown. It may be freely turned by means of the head $o'$, keyed to the screw, lateral movement being prevented by the fixed collar $o$, and thereby, when the screw is turned, the wedge to which it is connected is moved in or out and a corresponding movement of the adjacent block and its segment of bushing in direction normal to that of the wedge is caused. When in place, the bushings and the blocks part on two horizontal and one vertical plane (shown in Fig. 1) each parallel to the axis of the shaft. The exterior longitudinal surface of the bushing is octagonal and fits closely against the similar interior longitudinal surface of the blocks, so that when moved along its plane each block and its segment of bushing go together without separation or relative change of position.

Between the inner walls of the opening, as covered by the cap and the blocks, spaces are left sufficient to permit by means of the wedges on one side and the bottom adjacent to blocks 1 and 4 independent movement of the blocks and segments of bushing, and therefore adjustment in either direction. To cover these spaces and exclude the dust, as well as to aid in preventing lateral or end movement of the several parts, the blocks have broad flanges $b\ b$ at their ends, which clasp the side of the frame and cap, and for blocks 1 and 4 also inclose the wedges. The segments of the bushing have similar flanges at each end, which project over and clasp the adjacent blocks, as shown in Figs. 1, 2, 3, and 8.

To confine the movement of the several parts during adjustment to direction normal to the journal, and also to aid in preventing lateral movement, grooves are cut into the inner walls of the opening and cap, the inner surface of each pair of wedges, and the inner plane surface of each block, into which, respectively, fit closely, sidewise, corresponding feathers on the outer surface of each pair of wedges and of each block. Such grooves and feathers connect the frame, and wedges are shown at $a^2$, the frame and block at $a'$, and the wedges and blocks at $a^4 a^5$. The grooves and feather of a wedge are shown at $f^6$ and $f$. To allow free movement of the feathers past the edges of the segments of the bushing, the grooves are continued through, as shown in Fig. 8.

That the wedges at the bottom or side, when moved in or out, may not bind they are made in pairs, as shown, instead of in one piece. This allows a slight setting up of one end of the journal in advance of the other, if from uneven wear such is desirable.

To insure a nearly equal movement of the two wedges constituting a pair, a pin on the inner edge of one is inserted in a short slot in the inner edge of the other, as shown at $f^4$, thus limiting the difference in relative movement to the free space in the slot. In operation the two wedges are screwed in or out a short distance alternately.

To convey the lubricant used to the journal without leakage or loss between the cap, block, and bushing, the tubes are passed loosely down through the cap and block and screwed fast into the bushing. To prevent these tubes from limiting the movement of the block and bushing along the cap, the holes $m$ for the tubes, through the latter, are slotted, as shown in Figs. 9 and 10.

By the arrangements of parts, as described, it will be seen that a working stress, in direction inclined, as shown by $h$, Fig. 1, is taken and sustained on broad flat surfaces. The cylindrical journal-bearing in the pillow-block may, within certain limits, be increased or lessened in diameter to fit a particular journal, its precise position relative to the frame changed in any direction, the segment of bushing subject to wear set up against the journal as such wear occurs, and these segments, when worn, replaced by new ones without removing the shaft. The bushing is made of brass or other similar metal suitable for journal-bearings.

To insert an entire new bushing with the journal in place, first, elevate the latter by means of the lower pair of wedges and block it up, remove the cap and the pair of wedges attached thereto together, lift out blocks 2 and 1 and their segments, slack set-screws $e$, rotate block 3 and its segment and remove them, then slack off the lower pair of wedges until there is sufficient free space to rotate the lower segment and remove it. The new segment may be inserted and the other parts returned by the same process in reverse order.

The set-screw $d$ in cap A' adjusts blocks 2, and the set-screw $e$ in the side adjusts block 3. It will thus be seen that the four parts of the block can be adjusted from two sides of the frame, the two parts 1 and 2 from the upper side or top of the frame, and the two parts 3 and 4 from the right-hand side of the frame.

Having thus described my invention, I claim—

1. A pillow-block divided or separated into four parts on planes, two of which are horizontal and the other vertical, whereby adjustment in four directions is permitted under an inclined stress.

2. A pillow-block divided into four parts, in combination with two wedges or sets of wedges, one in a vertical plane to act horizontally against one vertical side of the block and the other in a horizontal plane to act vertically against a horizontal side of the block, whereby an inclined stress is received and sustained.

3. The combination, with the pillow-block, of the wedges built in pairs, each half with its operating-screw, and means—such as the pin and slot—for permitting of relative movement, in the manner described.

4. A pillow-block consisting of four adjustable parts, in combination with a frame confining the same, and mechanism for adjusting all of the parts, said mechanism being located on two sides of the frame at right angles to each other, substantially as described.

5. A pillow-block consisting of four parts confined in a frame, wedges for adjusting two of said parts which are adjacent to each other at right angles, and set-screws for adjusting the other two parts, substantially as described.

6. In a pillow-block, the combination, with a frame, of a four-part block, one part of which occupies all of one side of the frame and has a concavity formed in it to receive one quarter of a journal, the other parts constituting the remaining portions of the block, and means for adjusting each said part, substantially as described.

7. The combination, with the main frame and cap provided with grooves at right angles to the axis of the block, of the parts of the blocks provided with feathers or flanges on their backs fitting into the same.

8. The combination, with the frame, of the bolt provided with the two tight collars, one located on each side of the frame, and the key having a threaded portion at its larger end in which the bolt works, and an orifice below the threaded portion to receive the end of the bolt.

9. In a pillow-block, the combination of the stationary cap A', an adjustable section, as 2, and continuous oil-tubes passing through holes in both, the holes in the cap being elongated to allow freedom of movement in the same, as and for the purpose set forth.

In witness whereof I have hereunto signed my name in the presence of two subscribing witnesses.

GABRIEL LEVERICH.

Witnesses:
 WM. A. ROSENBAUM,
 THOMAS K. TRENCHARD.